United States Patent [19]

Murdock et al.

[11] Patent Number: 5,748,412
[45] Date of Patent: May 5, 1998

[54] METHOD AND APPARATUS FOR PROTECTING MAGNETORESISTIVE SENSOR ELEMENT FROM ELECTROSTATIC DISCHARGE

[75] Inventors: Edward S. Murdock, Edina; John C. Heitke, Burnsville; Kevin J. Schulz, Apple Valley, all of Minn.

[73] Assignee: Seagate Technology, Inc., Scotts Valley, Calif.

[21] Appl. No.: 580,059

[22] Filed: Dec. 20, 1995

[51] Int. Cl.⁶ .................................. G11B 5/127
[52] U.S. Cl. .................................. 360/113
[58] Field of Search ...................... 360/113, 126, 360/125, 122, 128, 103, 104; 324/207.21, 220

[56] References Cited

U.S. PATENT DOCUMENTS

| | | | |
|---|---|---|---|
| 3,056,119 | 9/1962 | Heman | 340/174.1 |
| 3,188,616 | 6/1965 | Simon | 340/174.1 |
| 4,053,936 | 10/1977 | Foust, Jr. | 360/62 |
| 4,317,149 | 2/1982 | Elser et al. | 360/126 |
| 4,398,226 | 8/1983 | Seim et al. | 360/65 |
| 4,633,451 | 12/1986 | Ahn et al. | 360/135 |
| 4,645,280 | 2/1987 | Gordon et al. | 339/17 F |
| 4,800,454 | 1/1989 | Schwarz et al. | 360/103 |
| 4,816,934 | 3/1989 | Tsuyuguchi | 360/62 |
| 4,996,623 | 2/1991 | Erpelding et al. | 360/104 |
| 5,027,239 | 6/1991 | Hagen | 360/104 |
| 5,375,022 | 12/1994 | Gill et al. | 360/113 |
| 5,422,764 | 6/1995 | McIlvanie | 360/97.01 |
| 5,465,186 | 11/1995 | Bajorek et al. | 360/113 |
| 5,491,605 | 2/1996 | Hughbanks et al. | 360/113 |
| 5,539,598 | 7/1996 | Denison et al. | 360/113 |
| 5,557,492 | 9/1996 | Gill et al. | 360/113 |
| 5,591,992 | 1/1997 | Leach | 257/173 |

FOREIGN PATENT DOCUMENTS

| | | | |
|---|---|---|---|
| 1329261 | 5/1994 | Canada | 353/30.3 |

OTHER PUBLICATIONS

Japanese article "The Latest Floppy Disk and Their Application Knowhow".

IBM Technical Disclosure Bulletin, vol. 17, No. 9, Feb. 1975, p. 2549.

*Primary Examiner*—Allen Cao
*Attorney, Agent, or Firm*—Kinney & Lange, P.A.

[57] ABSTRACT

A magnetoresistive head assembly includes a magnetoresistive sensor element, detection circuitry and first and second electrical conductors electrically connecting the magnetoresistive sensor element and the detection circuitry. A device exhibiting a non-linear voltage-current relationship is electrically coupled between the first and second electrical conductors. The device has a resistance which varies in relationship to an electrical potential between the first and second electrical conductors.

16 Claims, 5 Drawing Sheets

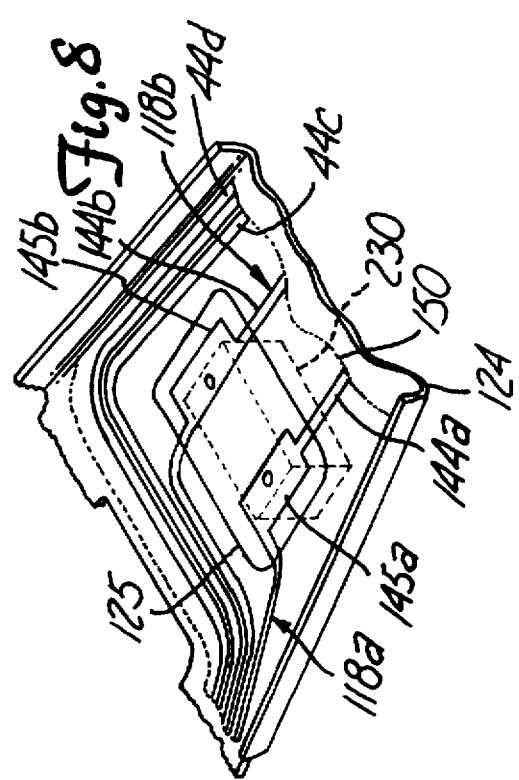

METHOD AND APPARATUS FOR PROTECTING MAGNETORESISTIVE SENSOR ELEMENT FROM ELECTROSTATIC DISCHARGE

This application claims priority pursuant to 35 U.S.C. 119(e) from Provisional Application No. 60/002,165 filed on Aug. 11, 1995.

BACKGROUND OF THE INVENTION

The present invention relates to magnetoresistive head assemblies. In particular, the present invention relates to a method and an apparatus for preventing damage to a magnetoresistive sensor element of the magnetoresistive head assembly caused by electrostatic discharge.

Magnetoresistive head assemblies are used in magnetic storage systems to detect magnetically encoded information. A magnetoresistive head assembly includes a magnetoresistive transducer or sensor element electrically connected to detection circuitry by at least two electrical conductors. The magnetoresistive sensor element has a resistance which modulates in response to changing magnetic fields corresponding to magnetically encoded information. The detection circuitry detects the resulting change in resistance by passing a sense current through the electrical conductors and through the magnetoresistive sensor element and by measuring the voltage drop across the magnetoresistive sensor element. The resulting voltage signal is used to recover information from a magnetic storage medium such as a magnetic disc.

Typically, the magnetoresistive sensor element is formed upon or fabricated as part of a wafer which is severed into a plurality of sliders. The slider carries the magnetoresistive sensor element adjacent the surface of the magnetic storage medium. Together, the magnetoresistive sensor and the slider constitute what is called a magnetoresistive head. The slider of the magnetoresistive head is supported above the magnetic storage medium as part of an arm assembly or as part of an E-block assembly. The arm assembly typically includes a support arm, a load beam or spring, a gimbal and the magnetoresistive head. The support arm carries the load beam and is attached to the load beam by a well-known technique referred to as swaging or ball staking. The load beam is attached, preferably by laser welding, to the gimbal. Lastly, the gimbal is preferably glued to the slider of the magnetoresistive head by fluid epoxy or other conventional adhesive materials. The support arm, load beam and gimbal support and carry the magnetoresistive head adjacent a magnetic storage medium such as a magnetic disc.

The first and second electrical conductors electrically connecting the magnetoresistive sensor element and the detection circuitry typically comprise conductive traces, bonding pads and electrical wires. The conductive traces extend along a surface of the slider and electrically interconnect the magnetoresistive sensor element and the bonding pads. The bonding pads are electrically connected to the magnetoresistive sensor element by the conductive traces and are located on a surface of the slider. The bonding pads provide a surface by which electrical conductors such as wire may be attached to electrically connect detection circuitry and the magnetoresistive sensor. The wires are typically tacked or bonded to the bonding pads and to at least one surface of the slider. The wires further extend along the gimbal, the load beam and the arm to the detection circuitry.

It has been discovered that electrostatic energy conducted or discharged to the magnetoresistive sensor element by direct electrical continuity or dielectric breakdown may possibly damage the magnetoresistive sensor element. Electrostatic energy may be generated any time during the fabrication, assembly, testing and shipment of the disc drive including fabrication of the magnetoresistive head, assembly of the head/gimbal assembly, assembly of the E-block, assembly of the final disc drive, electrical testing of components and shipment of the components or the disc drive. In response, various procedures and equipment have been installed to control electrostatic discharge (ESD) levels during every stage of handling through final disc drive assembly to prevent damage to the magnetoresistive sensor element caused by ESD. Currently, ESD handling procedures and equipment prevent discharges of more than about 20 volts to the magnetoresistive head. However, due to the continual drive to increase storage density in magnetic disc drive units, magnetoresistive sensor elements have become increasingly advanced and sensitive. Because of the smaller dimensions of advanced magnetoresistive heads and the thinner magnetoresistive sensor elements, electrostatic discharges to the magnetoresistive sensor element must be limited to five volts or less. Controlling electrostatic discharge to such a low voltage level with current ESD controls during handling is expensive and prone to failure due to equipment or personnel.

SUMMARY OF THE INVENTION

The present invention is a method and apparatus for protecting a magnetoresistive sensor element of a magnetoresistive head assembly from electrostatic discharge. The magnetoresistive sensor element includes first and second electrical conductors which are electrically connected to the magnetoresistive sensor element and which are adapted for being electrically connected to detection circuitry such as a preamp input. A device exhibiting a non-linear voltage-current relationship is electrically coupled between the first and second electrical conductors. The device has a resistance which varies in relationship to an electrical potential between the first and second electrical conductors. Upon the occurrence of a pre-selected electrical potential between the first and second electrical conductors, the resistance of the device is sufficiently low so as to shunt current between the first and second electrical conductors and to prevent damage to the magnetoresistive sensor element.

Preferred embodiments of the present invention include at least one diode electrically coupled between the first and second electrical conductors.

In one preferred embodiment, at least one diode is fabricated across the electrical conductors on a wafer or slider supporting the magnetoresistive sensor element. In a second embodiment, at least one diode is fabricated in place or attached across the electrical conductors on a surface of a slider supporting the magnetoresistive sensor element. In third embodiment, at least one diode is attached across the electrical conductors between a slider and the detection circuitry. Preferably, at least one diode is attached between first and second electrical conductors which are part of a flex circuit extending between the slider and the detection circuitry.

BRIEF DESCRIPTION OF THE DRAWINGS

FIG. 8 is a fragmentary perspective view of an alternate embodiment of the magnetoresistive head assembly of FIG. 1 illustrating a diode positioned across electrical conductors on a suspension of the magnetoresistive head assembly.

DETAILED DESCRIPTION OF THE PREFERRED EMBODIMENTS

Figure 1:
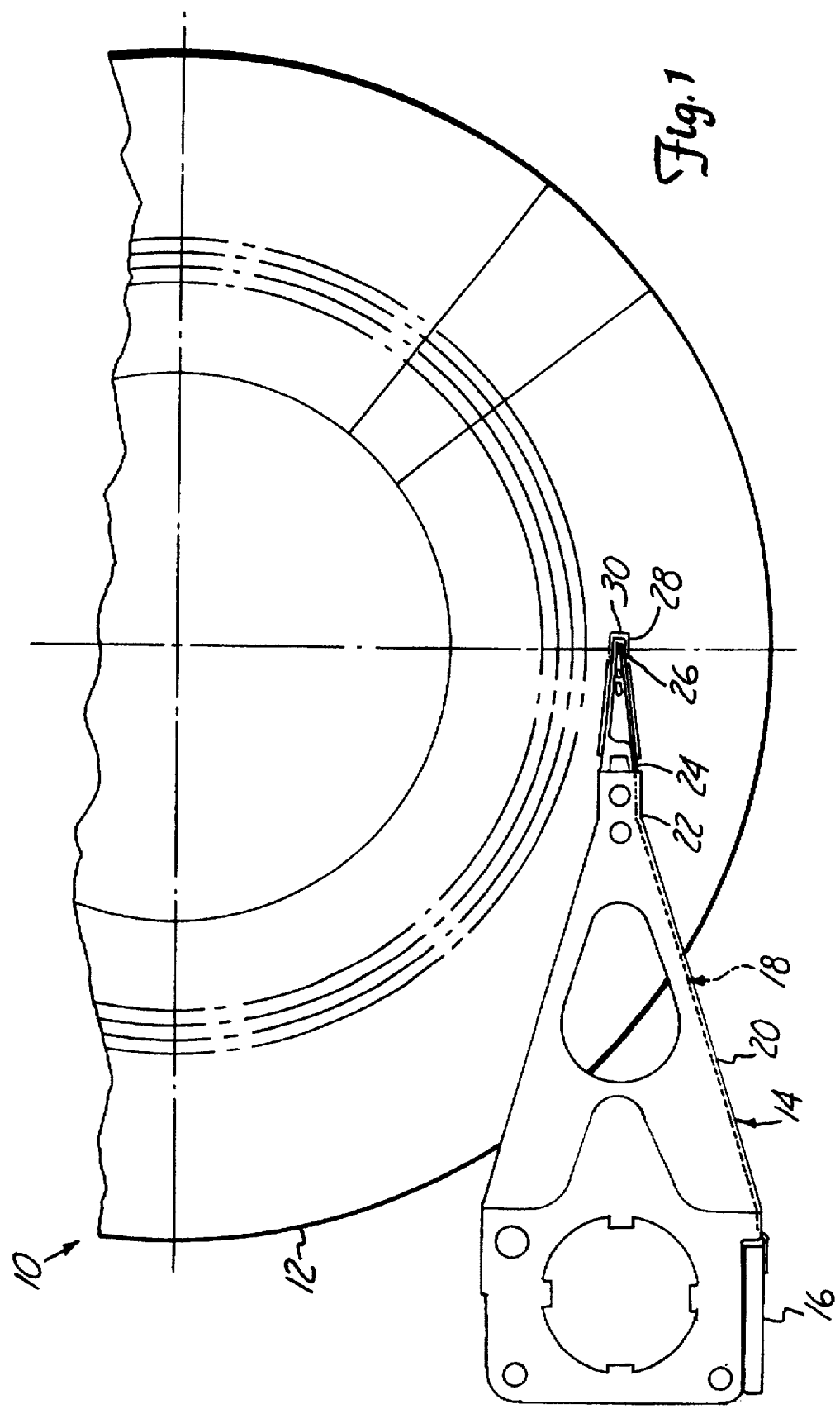
FIG. 1 is a diagrammatic fragmentary view of a magnetoresistive head assembly of the present invention.

FIG. 1 is a diagrammatic view of a magnetoresistive head assembly 10 generally including magnetic storage disc 12, arm assembly 14, detection circuitry 16 and electrical conductors 18. As is conventionally known, memory storage disc 12 contains magnetically encoded information and is rotated by a spindle motor (not shown).

Arm assembly 14 is supported above memory storage disc 12 by an actuator assembly (not shown) and generally includes actuator arm 20, support arm 22, suspension 24 and head 28. Actuator arm 20 extends from an actuator (not shown) and attaches to support arm 22. Support arm 22 extends from actuator arm 20 and is attached to suspension 24. Suspension 24, preferably comprises an integrated load beam-gimbal suspension including a gimbal portion 26. Alternatively, suspension 24 may include a distinct load beam and a distinct gimbal which are secured to one another, preferably by laser welding. Suspension 24 is preferably attached to head 28 by an adhesive such as glue or fluid epoxy. Alternatively, suspension 24 may be mounted to head 28 by other conventional mounting methods. Suspension 24 resiliently supports head 28 in the vertical direction to allow head 28 to follow the topography of disc 12. Suspension 24 also supplies a downward force to counteract the hydrodynamic lifting force developed as disc 12 moves beneath head 28. Suspension 24 is preferably formed from a material which enables suspension 24 to be flexible in the vertical direction and rigid in in-plane directions for precise head positioning. The gimbal portion 26 of suspension 24 is resiliently flexible in pitch and roll directions of head 28. At the same time, the gimbal portion 26 is preferably rigid in the yaw and in-plane directions for maintaining precise slider positioning.

Figure 2:
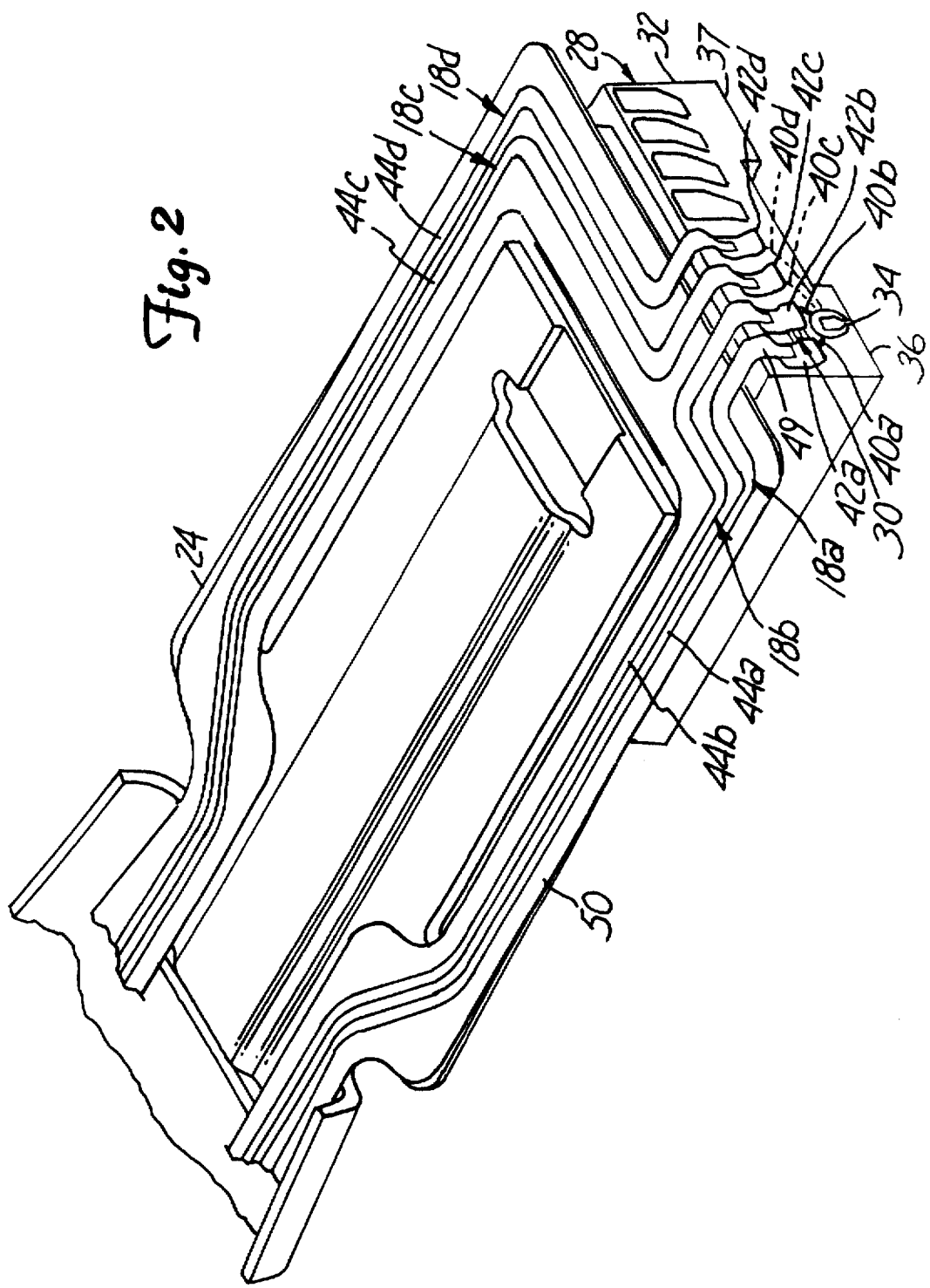
FIG. 2 is an enlarged fragmentary perspective view of the magnetoresistive head assembly illustrating a diode assembly of the present invention.

Head 28 preferably comprises an air-bearing slider 32 supporting at least one magnetoresistive sensor element 34 (shown in FIG. 2). Head 28 retrieves information stored on memory storage disc 12. In addition, if equipped with a write transducer, head 28 also stores information on memory storage disc 12. Head 28 is electrically connected to detection circuitry 16 via electrical conductors 18 which extend between the magnetoresistive element of head 28, as well as any additional reading or writing sensors/transducers, and detection circuitry 16.

Detection circuitry 16 preferably comprises a conventional circuit board mounted adjacent to the actuator (not shown). As is conventionally known, detection circuitry 16 typically includes a preamp unit. The preamp unit transmits a sense current through one of the electrical conductors to the magnetoresistive sensor element of head 28. The current is returned from the magnetoresistive sensor element of head 28 to the preamp of detection circuitry 16 via a second one of the electrical conductors electrically interconnecting the magnetoresistive sensor element of head 28 and detection circuitry 16. The preamp unit of detection circuitry 16 senses the change in voltage and the corresponding change in resistance across the magnetoresistive transducer or sensor element of head 28 to recover information from memory storage disc 12.

FIG. 2 is an enlarged fragmentary perspective view of magnetoresistive head assembly 10 illustrating diode assembly 30 and a preferred embodiment of suspension 24 and head 28 in greater detail. As best shown by FIG. 2, head 28 is mounted to suspension 24 below suspension 24 and includes slider 32 and magnetoresistive sensor element or transducer 34. Slider 32 is conventionally known and preferably includes a pair of self-acting hydrodynamic air bearing rails 36, 37. When disc 12 rotates, disc 12 draws air between air bearing rails 36, 37 and the surface of disc 12 to pressurize air bearing rails 36, 37 and to lift slider 32. As a result, slider 32 flies above disc 12.

Magnetoresistive sensor element 34 is conventionally known. Magnetoresistive sensor element 34 has a resistance which modulates in response to changing magnetic fields corresponding to magnetically encoded information upon memory storage disc 12. Magnetoresistive sensor element 34 retrieves information from memory storage disc 12. Magnetoresistive sensor element 34 is preferably located towards a lower surface of air bearing rails 36, 37. In the preferred embodiment illustrated, head 28 includes an additional sensor element, preferably an inductive write head (not shown), which is stacked between sensor element 34 and slider 32. In addition, sensor elements such as sensor element 34 may also be fabricated on or mounted to both rails 36, 37 of slider 32 as well as other portions of slider 32 adjacent memory storage disc 12.

As best shown by FIG. 2, electrical conductors 18a–18d include conductive traces 40a–40d, contact pads 42a–42d and conductive traces 44a–44d. Conductive traces 40a–40d are made of an electrically conductive material such as copper and are fabricated upon slider 32. Conductive traces 40a–40d are preferably deposited upon a wafer containing a plurality of sliders 32. Conductive traces 40a and 40b electrically connect magnetoresistive sensor element 34 and contact pads 42a and 42b, respectively. Conductive traces 40c and 40d electrically interconnect contact pads 42c and 42d with an additional sensor element (not shown) which is stacked between magnetoresistive sensor element 34 and slider 32.

Contact pads 42a–42d are formed from an electrically conductive material, such as copper, and are also fabricated upon a surface of slider 32. Contact pads 42a–42d are electrically connected to conductive traces 40a–40d, respectively, and provide a large surface area to which conductive traces 44a–44d may be electrically connected or bonded, respectively. Contact pads 42a–42d, also known as bond pads, enable conductive traces 44a–44d to be easily electrically connected to magnetoresistive sensor element 34.

Conductive traces 44a–44d comprise lines of electrically conductive material, such as copper, which are fabricated or deposited upon a dielectric material such as a polyimide or a polyester such as polyethyleneterephthalate (PET) which is preferably flexible to form a flex circuit 50. Conductive traces 44a–44d preferably extend beyond the dielectric material of flex circuit 50 in the form of flying leads 49 which are bonded to contact pads 42a–42d, respectively, by ultrasonic welding. Flex circuit 50 is adhesively secured to suspension 24 by an adhesive such as a viscoelastic adhesive or a rigid adhesive such as an epoxy or cyanoacrylate. In the preferred embodiment illustrated, the flex circuit 50 containing conductive traces 44a–44d is adhesively secured above suspension 24 and slider 32. Alternatively, flex circuit 50 may be secured by other methods such as bonding or crimping and may also be secured to suspension 24 below suspension 24. Flex circuit 50 and conductive traces 44a–44d extend along support arm 22 and actuator arm 20 (shown in FIG. 1) to detection circuitry 16. Because flex circuit 50 and conductive traces 44a–44d completely extend from contact pads 42 to detection circuitry 16, fewer interconnections are required. Thus, magnetoresistive head assembly 10 has greater reliability due to less electrical connections or joints otherwise capable of failure. As a result, conductive traces 40, contact pads 42 and conductive traces 44 form a complete electrical interconnection between magnetoresistive sensor element 34 and an additional sensor element (not shown) and detection circuitry 16. Alternatively, as can be appreciated, individual or bundled wires or other conventional conducting interconnects may be used in lieu of flexible circuit 50 and conductive traces 44 for providing an electrical connection between magnetoresistive sensor element 34 and detection circuitry 16.

In operation, electrical conductors 18a and 18b, also known as reader conductors, form an electrical circuit between magnetoresistive sensor element 34 and detection circuitry 16. Detection circuitry 16, in particular, the preamp unit, supplies a sense current through one of conductors 18a or 18b. The resistance of magnetoresistive sensor element 34 modulates in response to changing magnetic fields corresponding to magnetically encoded information. As a result, the voltage across magnetoresistive sensor element 34 also varies in response to the magnetically encoded information. The preamp unit of detection circuitry 16 measures the voltage change across the magnetoresistive sensor element to recover information from memory storage disc 12.

Diode assembly 30 electrically interconnects electrical conductors 18a and 18b. Diode assembly 30 exhibits a non-linear voltage-current relationship and has a resistance which varies in relationship to an electrical potential or voltage between electrical conductors 18a and 18b. Diode assembly 30 preferably includes at least one non-sacrificial diode. Diode assembly 30 has a resistance that prevents electrical conduction across diode assembly 30 between electrical conductors 18a and 18b when the electrical potential or voltage between electrical conductors 18a and 18b is approximately less than or equal to an operating voltage of magnetoresistive sensor element 34. At the same time, diode assembly 30 shunts current across diode assembly 30 between electrical conductors 18a and 18b to "short circuit" electrical conductors 18a and 18b when the electrical potential or voltage between conductors 18a and 18b is larger than a pre-selected protection threshold voltage (which is based upon the sensitivity of magnetoresistive sensor element 34 to electrostatic discharge).

Diode assembly 30 carries typical instantaneous current experienced during electrostatic discharges which may be as high as 10's of milliamps. As can be appreciated, a sufficiently large electrostatic discharge voltage may exceed the capacity of diode assembly 30 to shunt all current, resulting in an unacceptably large current through the magnetoresistive sense element and damage to magnetoresistive sensor element 34. Although diode assembly 30 may not completely eliminate the need for electrostatic discharge controls and manufacturing, diode assembly 30 eliminates the need for expensive and error prone ESD control methods required to control electrostatic discharge to under 20 volts. As a result, ESD control methods need only protect the magnetoresistive sensor element against significantly higher voltage levels such as between 100 and 200 volts. Protecting the magnetoresistive sensor element 34 against such significantly higher voltage levels is easier, less expensive and less prone to error.

In the preferred embodiment illustrated, diode assembly 30 preferably impedes current between conductors 18a and 18b at a voltage of less than or equal to about 0.5 volts, the operating voltage of magnetoresistive sensor element 34. Preferably, diode assembly 30 fully conducts current between conductors 18a and 18b when the forward voltage exceeds the desired protection level of about 1.4 volts. Although depicted as electrically interconnecting contact pads 42a and 42b of electrical conductors 18a and 18b, respectively, diode assembly 30 may be positioned across electrical conductors 18a and 18b anywhere between magnetoresistive sensor element 34 and detection circuitry 16. In addition, although diode assembly 30 is illustrated as including a pair of diodes or diode arrays electrically connecting contact pads 42a and 42b, in parallel, diode assembly 30 may alternatively include at least one diode or an array of diodes 60, 62 connected in series across contact pads 42a and 42b. As can be appreciated, the voltage-current characteristics of diode assembly 30 must be tailored to the operating conditions of magnetoresistive sensor element 34 and the level of electrostatic discharge protection required.

Figure 3A:
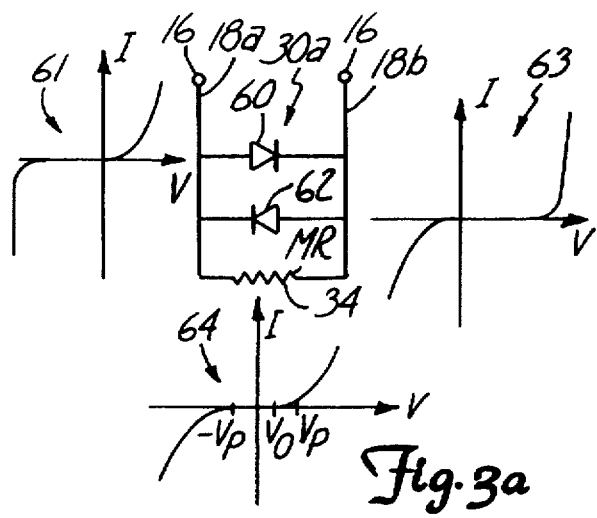
FIGS. 3a–3f are circuit diagrams illustrating various alternative configurations of the diode assembly including qualitative sketches of their respective voltage-current characteristics.

FIGS. 3a–3f are circuit diagrams illustrating various alternative configurations of diode assembly 30 including qualitative sketches of their voltage-current characteristics. FIG. 3a illustrates configuration 30a which includes a pair of oppositely directed diodes connected in parallel across electrical conductors 18a and 18b between magnetoresistive sensor element 34 and detection circuitry 16. The individual voltage (V)-current (I) characteristics of diode 60 are illustrated in sketch 61. The individual voltage (V)-current (I) characteristics of diode 62 are illustrated in sketch 63. The overall voltage (V)-current (I) characteristics of diode assembly 30a are illustrated in sketch 64. As shown by sketch 64, at or below voltage $V_o$, which represents the operating voltage of magnetoresistive sensor element 34, diode assembly 30a electrically impedes all current between electrical conductors 18a and 18b. As a result, diode assembly 30a does not affect normal operation of magnetoresistive sensor element 34 and detection circuitry 16. However, when the electrical potential or voltage across magnetoresistive sensor element 34 and between electrical conductors 18a and 18b exceeds the selected voltage protection threshold level, $V_p$, in either direction, diode assembly 30a effectively shunts or shorts current between electrical conductors 18a and 18b away from magnetoresistive sensor element 34 to electrically short electrostatic discharge current pulse away from magnetoresistive sensor element 34. Preferably, the absolute value of voltage $V_p$ is larger than $V_o$ and is set at one volt or more.

Figure 3B:
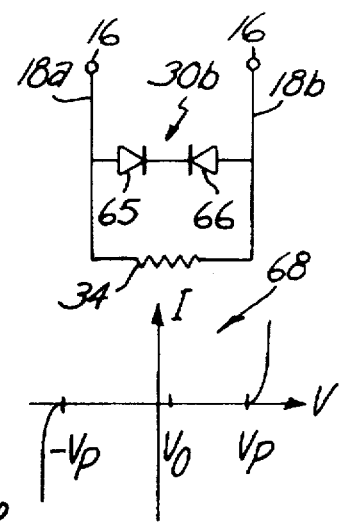

FIG. 3b illustrates an alternative configuration 30b for diode assembly 30. As shown by FIG. 3b, configuration 30b includes a pair of oppositely directed diodes 65, 66 connected in series across electrical conductors 18a and 18b between magnetoresistive sensor element 34 and detection circuitry 16. The resulting voltage (V)-current (I) characteristics of configuration 30b are illustrated in sketch 68. Configuration 30b produces a greater difference between the operating voltage, $V_o$, of magnetoresistive sensor element 34 and the electrostatic discharge protection threshold, $V_p$.

Figure 3C:
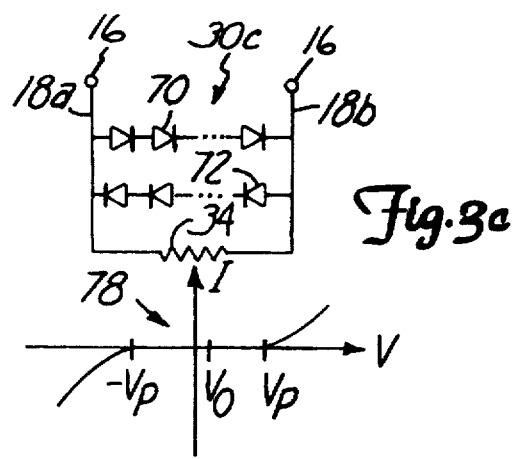

FIG. 3c illustrates an alternative circuit configuration 30c for diode assembly 30. Configuration 30c includes a first plurality of diodes 70 and a second plurality of diodes 72 connected in parallel across electrical conductors 18a and 18b and between magnetoresistive sensor element 34 and detection circuitry 16. Diodes 70 and 72 are oppositely directed with respect to one another. Sketch 78 illustrates the net voltage (V)-current (I) characteristics of configuration 30c. Configuration 30c produces a greater difference between the operating voltage, $V_0$, of magnetoresistive sensor element 34 and the electrostatic discharge protection threshold, $V_p$, selected as compared to configuration 30a shown in FIG. 3a.

Figure 3D:
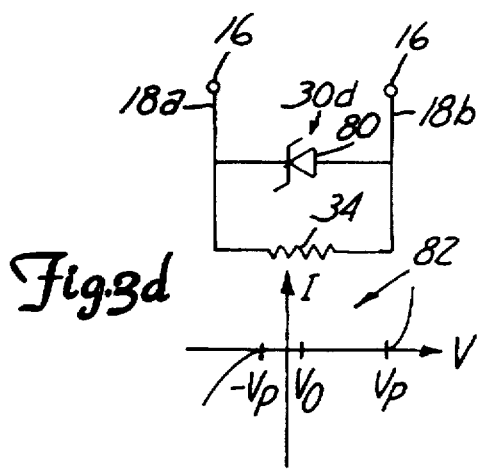
Figure 3E:
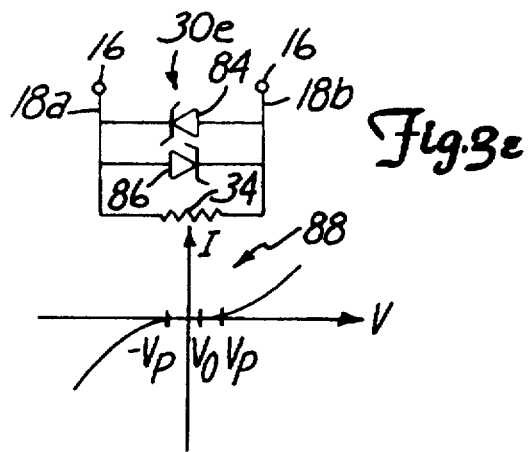
Figure 3F:
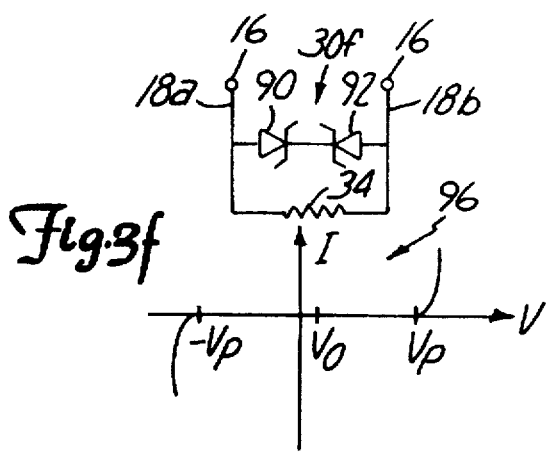

FIGS. 3d–3f illustrate configurations for diode assembly 30 using Zener diodes. FIG. 3d illustrates an alternative configuration 30d for diode assembly 30. Configuration 30d includes a Zener diode directed or oriented so that the operating voltage, $V_0$, of magnetoresistive sensor element 34 is applied to the reverse direction of Zener diode 80. The net voltage (V)-current (I) characteristics of configuration 30d are illustrated in sketch 82. As shown by sketch 82, Zener diode 80 impedes all current between electrical conductors 18a and 18b across diode 80 during normal operating conditions of magnetoresistive sensor element 34 operating at operating voltage, $V_0$. However, in the presence of an electrostatic discharge pulse of either polarity having a sufficient voltage greater than the operating voltage, $V_o$, the Zener diode 80 shunts current by conducting current between electrical conductors 18a and 18b across Zener diode 80 to protect magnetoresistive sensor element 34. As further shown by sketch 82, configuration 30d employing a single Zener diode 80 produces an asymmetric protection threshold wherein the protection threshold, $V_p$, is higher for a positive electrostatic discharge spike than for a negative electrostatic discharge spike.

FIGS. 3e and 3f illustrate diode assembly configurations which provide symmetric protection thresholds using Zener diodes. FIG. 3e illustrates an alternative configuration 30e for diode assembly 30. Configuration 30e includes a pair of oppositely directed Zener diodes 84, 86 connected in parallel across electrical conductors 18a and 18b between magnetoresistive sensor element 34 and detection circuitry 16. The net voltage (V)-current (I) characteristics of configuration 30e are illustrated in sketch 88 reflecting the relationship between the operating voltage, $V_O$ of magnetoresistive sensor element 34 and the protection threshold, $V_p$, produced by configuration 30e.

FIG. 3f illustrates an alternative configuration 30f for diode assembly 30. Configuration 30f includes a pair of oppositely directed Zener diodes 90, 92 connected in series across electrical conductors 18a and 18b between magnetoresistive sensor element 34 and detection circuitry 16. The resulting net voltage (V)-current (I) characteristics of configuration 30f is illustrated by sketch 96 which reflects the relationship between the operating voltage, $V_0$, of magnetoresistive sensor element 34 and the protection threshold, $V_p$, provided by configuration 30f.

Figure 4:
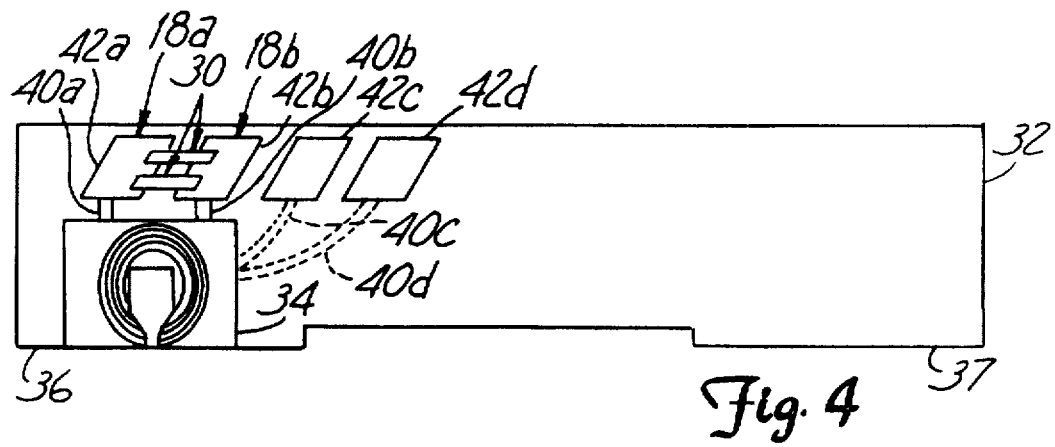
FIG. 4 is a rear view of a slider schematically illustrating a diode assembly of the present invention extending across contact pads.
Figure 5:
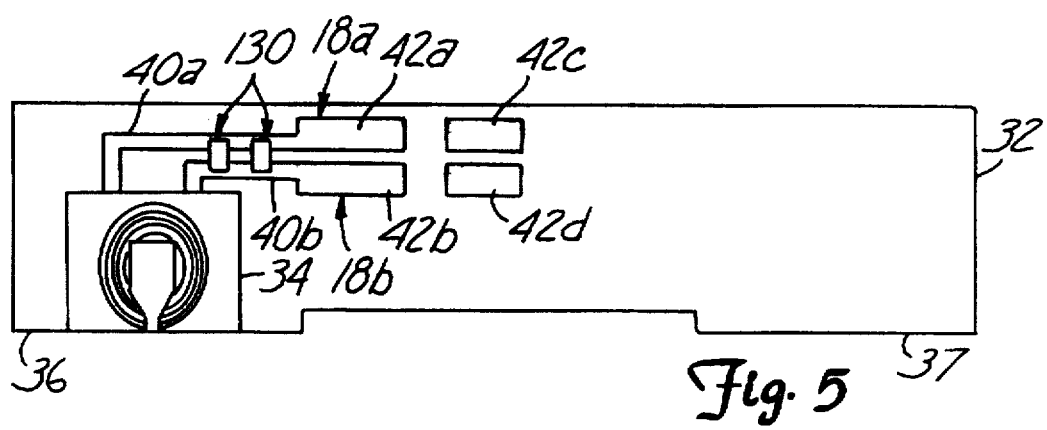
FIG. 5 is a rear view of a slider schematically illustrating a diode assembly extending across conductive traces.

In addition to having any one of a variety of different electrical configurations as exemplified in FIGS. 3a–3f, diode assembly 30 may also be interconnected across electrical conductors 18a and 18b in any one of a variety of locations between magnetoresistive sensor element 34 and detection circuitry 16. FIGS. 4 and 5 illustrate alternative locations for diode assembly 30 across electrical conductors 18a and 18b. FIG. 4 is a rear view of slider 32 schematically illustrating diode assembly 30 extending across contact pads 42a and 42b to electrically interconnect electrical conductors 18 and 18b which are electrically connected to magnetoresistive sensor element 34. FIG. 5 is a rear view of slider 32 schematically illustrating diode assembly 130 extending across conductive traces 40a and 40b to electrically interconnect electrical conductors 18a and 18b which are electrically connected to magnetoresistive sensor element 34. Diode assemblies 30 and 130 are substantially identical to one another except for their different locations on slider 32. Because diode assemblies 30 and 130 extend across electrical conductors 18a and 18b directly upon slider 32, diode assemblies 30 and 130 may be fabricated or mounted directly upon slider 32 at an earlier point in time prior to slider 32 being attached to suspension 24 (shown in FIG. 2) as part of the arm assembly 14. As a result, diode assemblies 30 and 130 may be utilized to protect magnetoresistive sensor element 34 from electrostatic discharges prior to slider 32 being assembled as part of a head/gimbal assembly substantially throughout the entire assembly, testing and shipment of the disc drive incorporating slider 32.

In the alternate embodiments illustrated in FIGS. 4 and 5, diode assemblies 30 and 130 are preferably fabricated directly on slider 32 which is preferably manufactured as part of a wafer that is later subdivided into a plurality of sliders similar to slider 32. Because diode assemblies 30 and 130 are fabricated directly upon the wafer which is ultimately divided to form slider 32, diode assemblies 30 and 130 provide electrostatic discharge protection of magnetoresistive sensor 34 from the time of wafer fabrication. In addition, fabricating one of diode assemblies 30 and 130 directly on a wafer forming slider 32 also eliminates handling required in bonding diodes to the back of slider 32. As an alternative to being fabricated directly upon slider 32, diode assemblies 30 and 130 may alternatively comprise separate diodes or diode arrays that are mounted or placed directly on slider 32 between contact pads 42a and 42b as shown in FIG. 4 or between conductive traces 40a and 40b as shown in FIG. 5. Small surface mount diode chips, or preferably their even smaller unpackaged dies, may be bonded onto and across portions of the electrical conductors 18a and 18b, such as conductive traces 40a and 40b or contact pads 42a and 42b, on slider 32.

Figure 6:
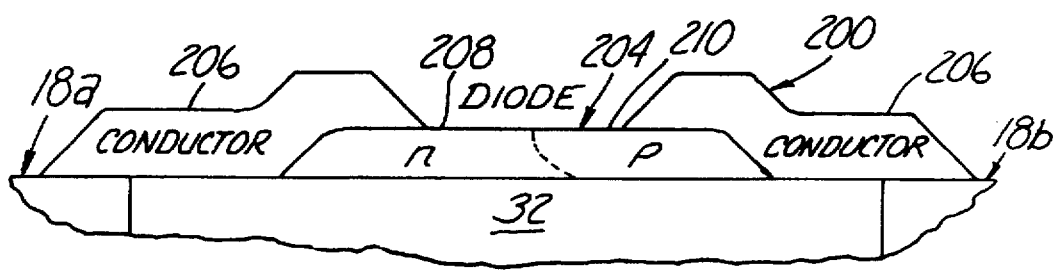
FIG. 6 is a cross-sectional view of a diode fabricated upon a surface of a slider.
Figure 7:
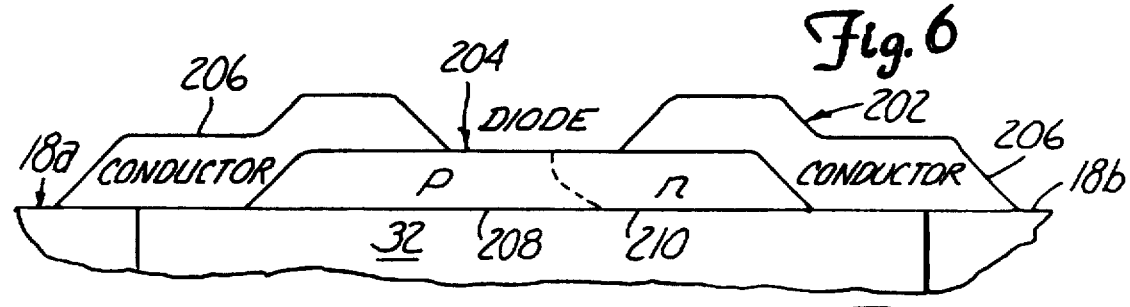
FIG. 7 is a cross-sectional view of a diode fabricated upon a surface of a slider.

FIGS. 6 and 7 illustrate individual, oppositely directed fabricated diodes 200 and 202 which are fabricated upon a surface of slider 32 between electrical conductors 18a and 18b. Fabricated diodes 200 and 202 may be utilized as part of diode assemblies 30 and 130 shown in FIGS. 2–5. As shown by FIGS. 6 and 7, fabricated diodes 200 and 202 include semiconductor material 204 and conductive material 206. The semiconductor material 204 is deposited between electrical conductors 18a and 18b and is electrically connected across electrical conductors 18a and 18b by conductive material deposited on slider 32 so as to overlap the semiconductor material 204 and electrical conductors 18a and 18b. In lieu of conductive material 206, semiconductor material 204 may alternatively be deposited so as extend across and partially overlie electrical conductors 18a and 18b. Once semiconductor material 204 is deposited upon slider 32, which may be still connected to adjacent sliders as part of a wafer, either donor impurities or acceptor impurities are diffused into both portions 208 and 210 of semiconductor material 204. If donor impurities are initially diffused into both portions, acceptor impurities are then infused into either portion 208 or portion 210 depending upon the desired orientation of the fabricated diode. Alternatively, if acceptor impurities are initially diffused into both portions, donor impurities are then diffused into either portion 208 or portion 210 depending upon the desired orientation of the fabricated diode. For example, diode 200 illustrated in FIG. 6 is fabricated by first diffusing donor impurities (n) into both portions 208 and 210. Acceptor impurities (p) are diffused into only portion 210 to create a p-n junction. Fabricated diode 202 is formed by diffusing acceptor impurities (p) into both portions 208 and 210 of semiconductor material 204. Donor impurities (n) are diffused into only portion 208 so as to form a p-n junction. Fabricated diodes 200 and 202 are oppositely oriented with respect to one another by diffusing acceptor impurities and donor impurities into opposite first and second portions 210 and 208, respectively, of semiconductor material 204 already diffused with donor and acceptor impurities, respectively.

Alternatively, conductive material 206 may first be deposited upon a substrate or slider 32 with a gap being formed between a pair of spaced portions of conductive material. The semiconductor material may then be deposited within the gap across the portions of conductive material. Lastly, the semiconductor material may be diffused or doped with acceptor and donor impurities adjacent the pair of spaced portions of conductive material, respectively. Furthermore, in lieu of being electrically connected to electrical connectors 18a and 18b, conductive material 206 may alternatively be electrically connected to another similarly fabricated diode having the same diode orientation or an opposite diode orientation.

Diodes 200 and 202 are preferably fabricated on slider 32 through the use of laser thermal deposition and laser induced diffusion of the necessary dopants. During laser thermal deposition and laser induced diffusion, slider 32, preferably as part of a wafer, is placed in low pressure semiconductor gas, preferably silane. A two micrometer or so area of slider 32 is heated with a laser to decompose and deposit silicon upon slider 32. Slider 32, or the wafer containing slider 32, is moved using a precise X-Y stage, so as to preferably deposit a 100 by 100 micrometer or so patch 204 of the silicon upon slider 32. If slider 32 is part of a wafer, the wafer is moved to similarly deposit a silicon patch 204 upon an adjacent slider.

After the semiconductive silicon (in polysilicon form) is deposited upon the wafer, the patch 204 is then alternately doped with donor (n) and acceptor (p) atoms depending upon the desired orientation of the fabricated diode. As illustrated in FIG. 6, the wafer including fabricated diode 200 is placed in a donor gas, preferably diborane. Portions 208 and 210 are heated with a laser to heat portions 208 and 210 so as to decompose and diffuse the donor atoms (boron) into the semiconductor material 204. After a sufficient area of semiconductor material 204 has donor atoms diffused into it, slider 32 is immersed into an acceptor gas, preferably phosphene. Portion 210 of the semiconductor material 204 is heated with a laser to decompose and diffuse the acceptor atoms (phosphorous) into only portion 210.

Diode 202 is similarly fabricated. After the silicon (in polysilicon form) is deposited upon the wafer, slider 32 is placed in an acceptor gas, preferably phosphene. Portions 208 and 210 are heated with a laser to heat portions 208 and 210 so as to decompose and diffuse the acceptor atoms (phosphorous) into the semiconductor material 204. After a sufficient area of semiconductor material 204 has acceptor atoms diffused into it, slider 32 is immersed in a donor gas, preferably diborane. Portion 208 of the semiconductor material 204 is heated with a laser to decompose and diffuse the donor atoms (boron) into only portion 208.

Once the donor (n) and acceptor (p) portions are formed in the semiconductor material 204, conductive material 206 is deposited upon slider 32 to interconnect the semiconductor material 204 to electrical conductors 18a and 18b or alternatively to adjacent, similarly fabricated semiconductor material 204 of another adjacent fabricated diode in series. Utilization of laser thermal deposition and laser induced diffusion eliminates the need for photoresist masks. In addition, the present fabrication method using laser thermal deposition and laser induced diffusion may be used to fabricate a plurality of individual diodes and a plurality of sliders at once. As can be appreciated, a multitude of donor and acceptor dopants other than phosphorus and boron may be used. In addition, a multitude of semiconductor materials other than silicon may be used. The general techniques of laser thermal deposition and laser induced diffusion are described in detail in D. Milne, A. Black, J. Wilson and P. John, "Laser Direct Writing of Silicon pn Junctions," Electronics Letters, 24, 1988, p. 19 and D. Milner, J. Wilson, T. Rantala and J. Lenkkeri, "Morphological and Structural Changes in Laser CVD of Silicon," Applied Surface Science, 43, 1989, p. 81, herein incorporated by reference.

Polysilicon deposited by thermal deposition and laser induced with the necessary dopants results in "soft" diodes which may conduct at less than the operating voltage, $V_O$, of magnetoresistive sensor element 34. To raise the protection threshold $V_p$ of a diode assembly 30 utilizing one of diodes 200, 202 fabricated upon slider 32 by thermal deposition and laser induced diffusion, a plurality of "soft" diodes may be connected in series between conductors 18a and 18b to build up the forward conduction voltage threshold as shown in configuration 30c in FIG. 3c. Alternatively, laser recrystalization may be used after deposition of the polysilicon to make a patch of single crystal silicon on slider 32 between electrical conductors 18a and 18b. Laser recrystalization is a well-known technique in which a laser beam is focused upon a local spot of the semiconductive polysilicon to heat the spot to a sufficient temperature to cause the crystals to change so as to create a large single crystal. After diffusion of necessary dopants, the resulting diode has a sharper and higher forward and reverse voltage thresholds, $V_p$, than "soft" polysilicon diodes.

In addition to laser thermal deposition and laser induced diffusion, other well-known processing methods may be used to deposit a semiconductor material such as silicon on slider 32 and to diffuse acceptor and donor impurities or dopants into the semiconductor material to create diodes. Examples of such processing methods include sputter deposition of the semiconductor material or the acceptor and donor impurities through a series of photo-pattern resist masks alternated with focused laser treatments and/or high temperature and annealing cycles to achieve desired voltage-current properties of the diode.

In addition to a diode assembly being fabricated or mounted directly upon slider 32 between electrical conductors 18a and 18b, a diode assembly may alternatively be fabricated or mounted anywhere across electrical conductors 18a and 18b between magnetoresistive sensor element 34 and detection circuitry 16. FIG. 8 is a fragmentary perspective view of a magnetoresistive head assembly 210 illustrating a diode assembly 230 positioned on suspension 124 between electrical conductors 118a and 118b. Magnetoresistive head assembly 210 is similar to magnetoresistive head assembly 10 (shown in FIG. 1) and includes suspension 124, flex circuit 150, electrical conductors 118a, 118b including conductive traces 144a and 144b, respectively, and diode assembly 230. Suspension 124 is identical to suspension 24 illustrated in FIG. 2 except that suspension 124 defines a diode window 125 which extends through suspension 124. Window 125 is preferably sized for receiving diode assembly 230 therethrough. Flex circuit 150 is similar to flex circuit 50 shown in FIG. 2 except that flex circuit 150 overlays a central portion of suspension 124 across window 125. Flex circuit 150 supports and insulates conductive traces 144a and 144b of electrical conductors 118a and 118b, respectively. Electrical conductors 118a and 118b are substantially identical to electrical conductors 18a and 18b, shown in FIG. 2, except that conductive traces 144a and 144b, corresponding to conductive traces 44a and 44b (shown in FIG. 2), are repositioned on flex circuit 150 so as to extend through a central portion of flex circuit 150 in a spaced apart relationship across window 125 of suspension 124. Preferably, conductive traces 144a and 144b include bonding pads 145a and 145b, respectively, having a larger surface area for enabling electrical components such as diode assembly 230 to be fabricated or mounted across conductive traces 144a and 144b of electrical conductors 118a and 118b.

Diode assembly 230 is electrically connected to bonding pads 145a and 145b across conductive traces 144a and 144b. Diode assembly 230 preferably includes at least one small surface packaged diode chip die mounted to bond pads 145a and 145b. Diode assembly 230 preferably includes at least one non-sacrificial diode having a resistance that prevents electrical conduction across diode assembly 230 between electrical conductors 118a and 118b when the electrical potential or voltage between electrical conductors 118a and 118b is approximately less than or equal to an operating voltage of magnetoresistive sensor element 34. At the same time, diode assembly 230 shunts current across diode assembly 230 between electrical conductors 118a and 118b to "short circuit" electrical conductors 118a and 118b when the electrical potential or voltage between conductors 118a and 118b is larger than a preselected protection threshold voltage based upon the sensitivity of magnetoresistive sensor element 34 to electrostatic discharge. Diode assembly 230 may have any one of the circuit configurations 30a–30f illustrated in FIGS. 3a–3f.

In the preferred embodiment illustrated, diode assembly 230 extends from below suspension 124 through window 125 to abut flex circuit 150. Alternatively, small surface mount diode chips may be directly mounted across bond pads 145a and 145b. Because diode assembly 230 extends through window 125 from beneath suspension 124, the overall height of suspension 124, flex circuit 150 and diode assembly 230 is reduced. Alternatively, diode assembly 230 may be fabricated or mounted across electrical conductors 118a and 118b above suspension 124 and flex circuit 150. In addition to enabling diode assembly 30 to be directly mounted upon suspension 124, flex circuit 150 also enables any one of a variety of electrical circuits, such as preamp electrical components or other read/write electronic components to be mounted directly upon suspension 124 in greater proximity to magnetoresistive sensor element 34.

In conclusion, the present invention reliably and economically protects magnetoresistive sensor elements of magnetic heads from electrostatic discharge. If the diode or set of diodes is fabricated or mounted directly upon the slider prior to slicing of a wafer into individual sliders, the magnetoresistive sensor element is protected from ESD discharges during slider fabrication through final assembly into a disc drive. If the diode or set of diodes are fabricated or mounted between the electrical conductors on the suspension or further towards the detection circuitry, the magnetoresistive sensor element is protected from electrostatic discharges from the point of assembly of the head/gimbal assembly through final assembly into a disc drive. Because the protective diodes are not one-event sacrificial elements, the present invention provides continual protection against possible repeated electrostatic discharges. Because the diode or sets of diodes are built into the magnetoresistive head assembly and are always present, the diode or sets of diodes of the present invention protect the magnetoresistive sensor element regardless of the efficacy of external control measures for electrostatic discharge. Thus, the diode or sets of diodes of the present invention reliably protect the magnetoresistive sensor element from electrostatic discharge throughout the handling and processing of the wafer to form sliders and throughout assembly of the disc drive.

The present invention may have any one of a variety of different structural and electrical configurations to achieve desired diode assembly characteristics and desired ESD protection thresholds. As discussed above, the magnetoresistive sensor element may be protected from electrostatic discharge by at least one diode emplaced directly upon a slider or upon a wafer which is later subdivided into sliders. Alternatively, one or more diodes may be attached across the electrical conductors interconnecting the detection circuitry and the magnetoresistive sensor element along the load beam or suspension. Electrical configurations of the diode assemblies may include Zener diodes, P-N junction diodes or any one of a variety of different diode types. If a plurality of diodes are used, the diodes may be electrically connected in series or in parallel across the electrical conductors between the magnetoresistive sensor element and the detection circuitry.

Although the present invention has been described with reference to preferred embodiments, workers skilled in the art will recognize that changes may be made in form and detail without departing from the spirit and scope of the invention.

What is claimed is:

1. In a magnetoresistive head assembly having a slider, a magnetoresistive sensor element on the slider for detecting data on a disc adjacent the slider, the magnetoresistive sensor element having an operating voltage within a design voltage range, a detection circuitry, and first and second electrical conductors for electrically connecting the magnetoresistive sensor element to the detection circuitry to form an electrical circuit between the magnetoresistive element and the detection circuitry, the first and second electrical conductors providing signals to the detection circuitry representing data detected by the magnetoresistive sensor element, at least a portion of the first and second electrical conductors being located on the slider, an improvement comprising:

a device mounted or fabricated directly on the slider electrically coupled between the first and second electrical conductors, the device exhibiting a non-linear voltage-current relationship to provide an electrical resistance which varies in relationship to an electrical voltage between the first and second electrical conductors the electrical resistance of the device being high to impede a current between the first and second conductors on the slider when the voltage between the first and second electrical conductors on the slider is within the design voltage range and being low to conduct a current between the first and second conductors on the slider when the voltage between the first and second electrical conductors is outside the design voltage range.

2. The assembly of claim 1 wherein the device includes at least one diode.

3. The assembly of claim 2 wherein the diode comprises a P-N junction diode.

4. The assembly of claim 2 wherein the diode comprises a zener diode.

5. The assembly of claim 2 wherein the diode comprises a surface mount diode.

6. The assembly of claim 2 wherein the diode comprises a die.

7. The assembly of claim 1 wherein the device includes:
a pair of oppositely directed diodes.

8. The assembly of claim 1 wherein the device includes:
a plurality of oppositely directed diodes connected in series between the first and second electrical conductors.

9. The assembly of claim 1 wherein the device includes:
a first plurality of diodes and a second plurality of diodes connected in parallel between the first and second electrical conductors, the first plurality of diodes and the second plurality of diodes being oppositely directed.

10. The assembly of claim 1 wherein the magnetoresistive sensor and at least a portion of the first and second electrical conductors are fabricated upon the slider and wherein the device is fabricated on the slider across the first and second electrical conductors.

11. The assembly of claim 1 wherein the device impedes the current between the first and second electrical conductors on the slider when the electrical voltage between the first and second electrical conductors on the slider is less than about 0.5 volts and shunts the current between the first and second electrical conductors on the slider when the electrical voltage between the first and second conductors on the slider exceeds about 0.5 volts.

12. The assembly of claim 1 wherein the device fully conducts the current when the electrical voltage between the first and second electrical conductors on the slider exceeds about 1.4 volts.

13. A method of protecting a magnetoresistive sensor from electrostatic discharge, the magnetoresistive sensor located on a slider and having first and second conductors on the slider for connecting the magnetoresistive sensor to an external circuitry, first and second read lines providing electrical signals representing data read by the magnetoresistive sensor from a magnetic disc adjacent the slider, the magnetoresistive sensor having an operating voltage within a design voltage range, the method comprising:

providing at least one diode mounted or fabricated directly on the slider and electrically connected between the first and second electrical conductors located on the slider, the diode exhibiting a non-linear voltage-current relationship to provide an electrical resistance which varies in relationship to an electrical voltage between the first and second electrical conductors, the electrical resistance of the diode being high to impede a current between the first and second conductors on the slider when the voltage between the first and second electrical conductors on the slider is within the design voltage range and being low to conduct a current between the first and second conductors on the slider when the voltage between the first and second electrical conductors is outside the design voltage range.

14. The method of claim 13 wherein the at least one diode between the first and second electrical conductors is provided by depositing a semiconductor material on the slider between the first and second electrical conductors; and forming a p-n junction in the semiconductor material.

15. The method of claim 13 wherein the at least one diode between the first and second electrical conductors is mounted to a surface of the slider between the first and second electrical conductors.

16. A magnetoresistive head assembly for reading data from a magnetic disc comprising:

a slider;

a magnetoresistive sensor element mounted or fabricated directly on the slider for detecting data on said disc adjacent the slider, the magnetoresistive sensor element having an operating voltage within a design voltage range;

first and second electrical conductors for electrically connecting the magnetoresistive sensor element to a detection circuitry external to the assembly to form an electrical circuit between the magnetoresistive element and the detection circuitry, the first and second electrical conductors providing signals to the detection circuitry representing data detected by the magnetoresistive sensor element, at least a portion of the first and second electrical conductors being located on the slider; and a device mounted or fabricated directly on the slider electrically coupled between the first and second electrical conductors, the device exhibiting a non-linear voltage-current relationship to provide an electrical resistance which varies in relationship to an electrical voltage between the first and second electrical conductors, the electrical resistance of the device being high to impede a current between the first and second conductors on the slider when the voltage between the first and second electrical conductors on the slider is within the design voltage range and being low when the to conduct a current between the first and second conductors on the slider when the voltage between the first and second electrical conductors is outside the design voltage range.

\* \* \* \* \*

UNITED STATES PATENT AND TRADEMARK OFFICE
CERTIFICATE OF CORRECTION

PATENT NO. : 5,748,412
DATED : MAY 5, 1998
INVENTOR(S) : EDWARD S. MURDOCK ET AL.

It is certified that error appears in the above-identified patent and that said Letters Patent is hereby corrected as shown below:

Col. 5, Line 6, delete "viscoclastic", insert --viscoelastic--

Col 10, Line 30, delete "$V_p$of", insert --$V_p$ of--

Col. 10, Line 35, after "FIG. 3c.", insert --(a space)--

Col. 14, Line 50, delete "being low when the to conduct", insert --being low to conduct--

Signed and Sealed this

Thirty-first Day of August, 1999

Q. TODD DICKINSON

*Attest:*

*Attesting Officer*  *Acting Commissioner of Patents and Trademarks*

UNITED STATES PATENT AND TRADEMARK OFFICE
CERTIFICATE OF CORRECTION

PATENT NO.   : 5,748,412
DATED        : May 5, 1998
INVENTOR(S)  : Murdock et al.

It is certified that error appears in the above-identified patent and that said Letters Patent is hereby corrected as shown below:

<u>Title page,</u>
Insert provisional application data as follows:

-- Related U.S. Application Data
[60]  Provisional application No. 60/002,165, filed on Aug. 11, 1995 --

Signed and Sealed this

Twenty-third Day of September, 2003

JAMES E. ROGAN
*Director of the United States Patent and Trademark Office*